United States Patent
Mast et al.

(10) Patent No.: US 6,485,235 B1
(45) Date of Patent: Nov. 26, 2002

(54) CUTTING TOOL ASSEMBLY WITH REPLACEABLE CUTTING HEAD

(75) Inventors: Wendell E. Mast, Dundee, OH (US); Timothy G. Stokey, Dover, OH (US); Joseph P. Nuzzi, Dover, OH (US)

(73) Assignee: Allied Machine & Engineering Corp., Dover, OH (US)

( * ) Notice: Subject to any disclaimer, the term of this patent is extended or adjusted under 35 U.S.C. 154(b) by 0 days.

(21) Appl. No.: 09/850,891

(22) Filed: May 8, 2001

(51) Int. Cl.[7] .............................................. B23B 51/02
(52) U.S. Cl. ..................... 408/1 R; 408/144; 408/230; 408/233; 408/713
(58) Field of Search ................................ 408/1 R, 144, 408/200, 226, 231, 233, 230, 713

(56) References Cited

U.S. PATENT DOCUMENTS

| | | | |
|---|---|---|---|
| 930,436 A | * 8/1909 | Thomas | 408/233 |
| 1,746,716 A | 2/1930 | Sasse | |
| 2,259,611 A | 10/1941 | Burger | |
| 2,935,906 A | 5/1960 | Andreasson | |
| 3,359,837 A | * 12/1967 | Andreasson | 407/11 |
| 3,548,688 A | * 12/1970 | Kuch | 403/339 |
| 4,950,108 A | 8/1990 | Roos | |
| 5,399,051 A | 3/1995 | Aken et al. | |
| 5,452,971 A | * 9/1995 | Nevills | 408/229 |
| 5,863,162 A | 1/1999 | Karlsson et al. | |
| 5,899,642 A | 5/1999 | Berglöw et al. | |
| 5,947,660 A | 9/1999 | Karlsson et al. | |
| 5,957,631 A | 9/1999 | Hecht | |
| 5,971,673 A | 10/1999 | Berglund et al. | |
| 5,988,953 A | 11/1999 | Berglund et al. | |
| 6,012,881 A | 1/2000 | Scheer | |
| 6,059,492 A | 5/2000 | Hecht | |
| 6,109,841 A | * 8/2000 | Johne | 408/144 |
| 6,241,433 B1 | 6/2001 | Rydberg et al. | |

FOREIGN PATENT DOCUMENTS

| | | |
|---|---|---|
| DE | 94340 | 10/1897 |
| EP | 0 118 806 A1 | 9/1984 |
| FR | 2 613 648 A1 | 4/1988 |

* cited by examiner

*Primary Examiner*—Daniel W. Howell
(74) *Attorney, Agent, or Firm*—Hahn Loeser & Parks, LLP; Robert J. Clark (57) ABSTRACT

The present invention provides a new cutting tool assembly comprising a replaceable cutting head and a tool body having a common longitudinal axis and mating peripheral surfaces. The cutting head has a cutting portion forming a leading end, a pilot portion forming a trailing end, and a cutting head mounting portion adjacent the trailing end of the cutting head. The tool body has a cutting head receiving portion formed at a leading end of the tool body and a pilot recess disposed in the leading end of the tool body to matingly receive the pilot portion of the cutting head. The cutting head mounting portion and the cutting head receiving portion of the tool body each have at least two coupling portions. The cutting head coupling portions and the tool body coupling portions are bound by their peripheral surfaces and generally mate in shape and dimensions. Each coupling portion has a pair of base surfaces, including upper and lower surfaces. The base surfaces extend transversely to the longitudinal axis and provide support of the cutting head in the tool body. A torque transmission wall extends between the upper and lower base surfaces from the pilot portion surface in a generally transverse direction relative to the longitudinal axis and oriented transversely to the base surfaces. A fastener may be disposed in the tool body along its longitudinal axis where it matingly engages the pilot portion of the cutting head and exerts an axial force on the cutting head for pressing the cutting head mounting portion against the cutting head receiving portion of the tool body.

16 Claims, 10 Drawing Sheets

CUTTING TOOL ASSEMBLY WITH REPLACEABLE CUTTING HEAD

TECHNICAL FIELD

The present invention relates to a cutting tool assembly for rotary cutting and/or machining, comprising a tool body and a replaceable cutting head. More particularly, the present invention relates to a cutting tool having a replaceable cutting head retained on a tool body by a retaining system, wherein the cutting head comprises a unique mating surface configuration enabling an increased retention force on the cutting head while providing optimized torque transferability.

BACKGROUND OF THE INVENTION

It is previously known to provide rotary cutting tools, such as drills, with replaceable cutting heads or drill tips. These tips have been retained on a tool body by many methods including radial set screws secured through lands provided on the tool body, press fit connections using dove-tail profiles, axial screws and drawbars, etc. While each method has different advantages and disadvantages, none of these tools can be easily and quickly replaced while maintaining optimized torque transferability, high feed rates, and a secure mounting to the tool body. Some prior tools of this type have worked well but have not been generally usable in aggressive machining operations, which produce high stress on the connection of the cutting head to the tool body.

Several examples of prior art configurations use a dovetail profile to connect the cutting head to the tool body. The cutting head is inserted into a recess generally having at least one radial base surface. The cutting head is then rotated such that a dovetail profile on the cutting head engages a dovetail recess of the tool body. This engagement is typically an interference fit type arrangement such that the cutting head is prevented from rotating in a disengaging direction. In order for the interference fit to provide sufficient retaining force, high stresses result at the tool body interface with the cutting head and in some cases, a special tool is needed to connect and disconnect the cutting head. Another problem with such a connection is that the feed force during operation of the tool pushes the cutting head downward into the tool body, which can lessen the retaining force of the dovetail connection and permit the cutting head to loosen.

Other examples of connecting the cutting head use an axial engagement bar to secure the cutting head to the tool body. Although attempting to clamp the head to the body, the high stress at the interface again may result in loosening of the connection and/or make the tool susceptible to eccentric and other loads.

It is also found in various tools with replaceable cutting heads, that it may be impossible to change the cutting head while the tool is mounted in an associated tool holder or machine. Thus, it is required that the entire tool be removed from the tool holder or machine, the cutting head then being replaced, and the tool being reintroduced into the machine for continued operation. Such a process adds labor and time, and detracts from the advantages of having the replaceable insert, and from the machining speeds achievable.

Accordingly, there remains a need in the art for a new drill assembly utilizing a replaceable cutting head which combines the advantages of a replaceable cutting head with the ability to be used in aggressive machining operations in which high stress conditions will exist. There also remains a need to provide drill assembly utilizing a replaceable cutting head which allows the cutting head to be replaced while the tool is mounted in the tool holder or machine to simplify and speed up this process.

SUMMARY OF THE INVENTION

It is therefore an object of the present invention to provide a new cutting tool assembly comprising a replaceable cutting head and a tool body having a common longitudinal axis and mating peripheral surfaces. The cutting head has a cutting portion forming a leading end, a pilot portion forming a trailing end, and a cutting head mounting portion adjacent the trailing end of the cutting head. The tool body has a cutting head receiving portion formed at a leading end of the tool body and a pilot recess disposed in the leading end of the tool body to matingly receive the pilot portion of the cutting head. The cutting head mounting portion and the cutting head receiving portion of the tool body each have at least two coupling portions. The cutting head coupling portions and the tool body coupling portions are bound by their peripheral surfaces and generally mate in shape and dimensions. Each coupling portion has a pair of base surfaces, including upper and lower surfaces. The base surfaces extend transversely to the longitudinal axis and provide support of the cutting head in the tool body. A torque transmission wall extends between the upper and lower base surfaces from the pilot portion surface in a generally transverse direction relative to the longitudinal axis and oriented transversely to the base surfaces. A fastener may be disposed in the tool body along its longitudinal axis where it matingly engages the pilot portion of the cutting head and exerts an axial force on the cutting head for pressing the cutting head mounting portion against the cutting head receiving portion of the tool body.

DETAILED DESCRIPTION

Figure 1:
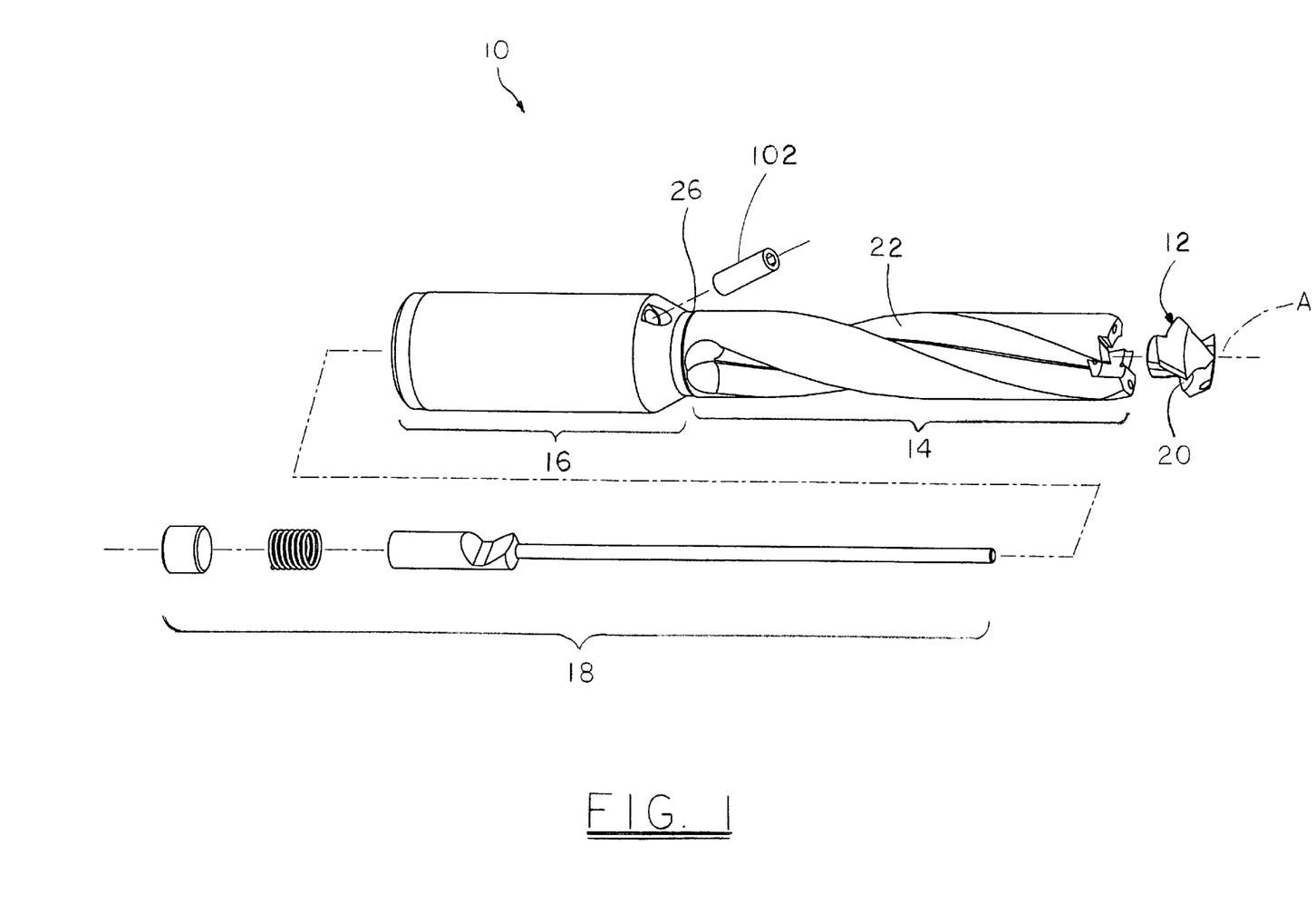
FIG. 1 is an exploded perspective view of the cutting tool assembly of the present invention along its longitudinal axis A.

Referring now to the drawings, wherein similar reference characters designate corresponding parts throughout the several views, there is generally indicated at 10 a cutting tool assembly according to the present invention, for use in drilling operations. Referring now to FIG. 1, cutting tool assembly 10 having a longitudinal axis A, comprises a replaceable cutting head 12, a tool body 14 formed on a tool shank 16, and a fastening assembly 18 to facilitate retention of the cutting head 12 on tool body 14. The cutting head 12 and the tool body 14 are formed with chip flute sections 20, and 22, respectively, that, when the cutting tool is assembled, form continuous, preferably helical, flutes 24 which extend from the cutting head 12 to the trailing end 26 of the tool body 14.

Figure 2:
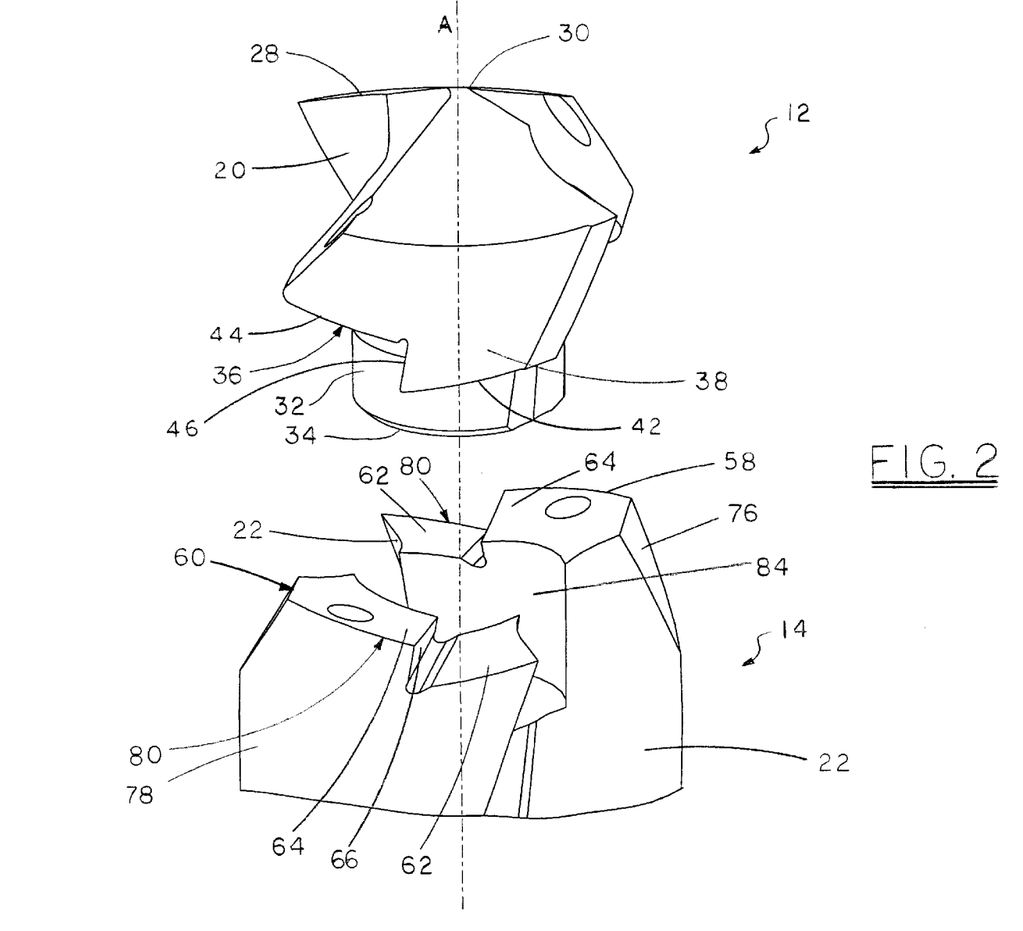
FIG. 2 is a perspective view of the cutting head and leading end of the tool body in accordance with the present invention of FIG. 1.
Figure 3:
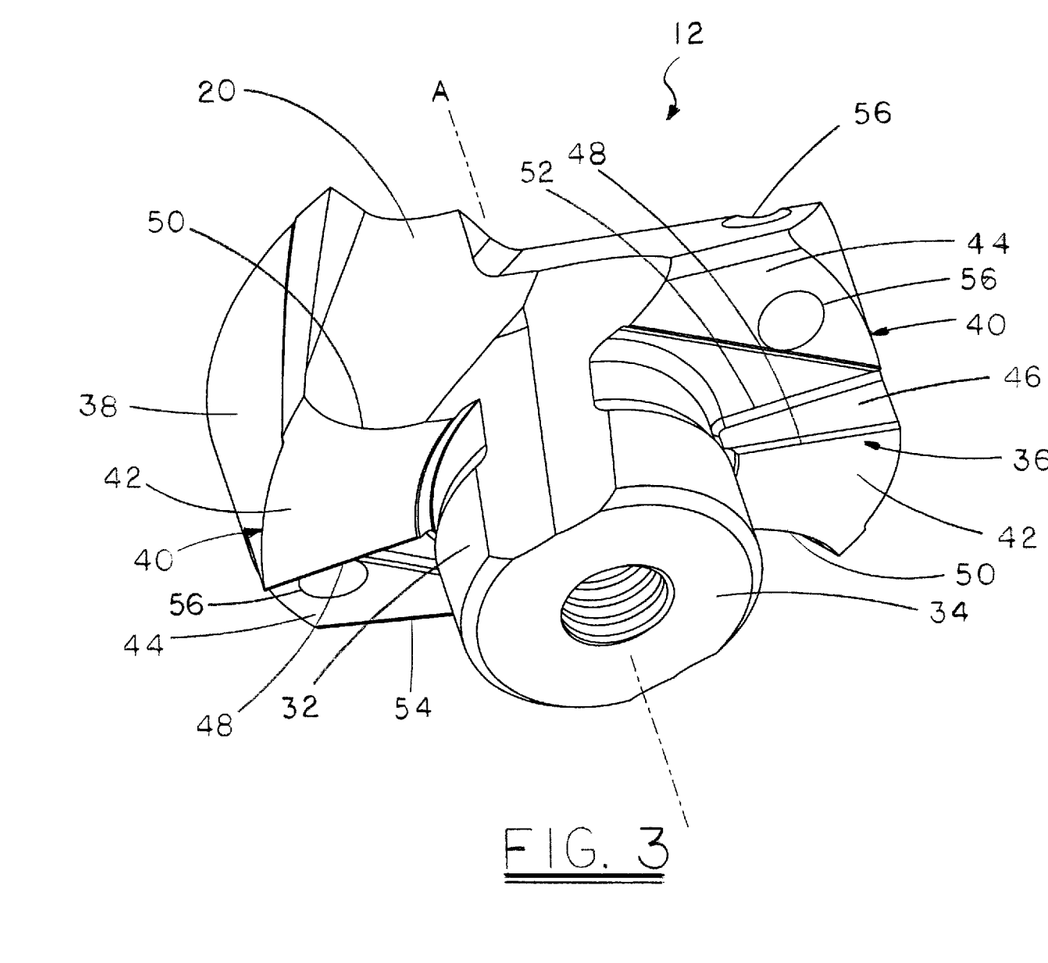
FIG. 3 is a perspective view of the cutting head which is inclined along longitudinal axis A revealing the pilot portion at the trailing end of cutting head and the cutting head mounting portion in accordance with the present invention of FIG. 1.
Figure 4:
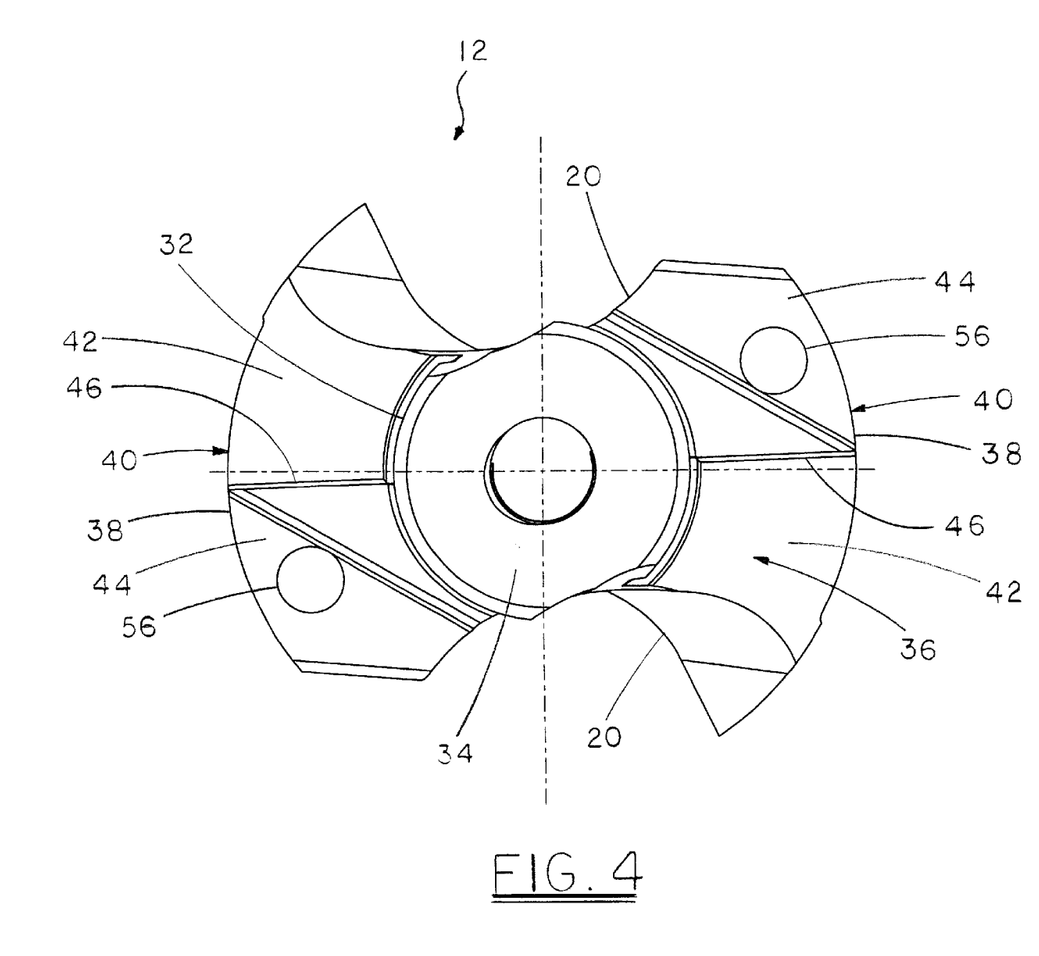
FIG. 4 is an end view of the trailing end of the cutting head in accordance with the present invention of FIG. 1.

As illustrated in FIGS. 2–4, the cutting head 12 has a cutting portion 28 formed on a leading end 30 of the cutting head 12, a generally cylindrical pilot portion 32 forming a trailing end 34 of the cutting head 12, and a cutting head mounting portion 36 adjacent the pilot 32 of the cutting head 12. The cutting portion 28 of the cutting head 12 will not be described herein since it does not constitute the subject matter of the present invention. However, it should be noted that the cutting portion 28 of the cutting head 12 may have any appropriate design for the intended machining operation to be performed. The cutting head mounting portion 36 comprises a pair of diametrically disposed cutting head coupling portions 40 each bound by a land, or peripheral surface 38 and the chip flutes 20 and separated from each other diametrically by cylindrical pilot portion 32. Each cutting head coupling portion 40 has a single-step configuration with a lower base surface 42 adjacent one chip flute section 20, an upper base surface 44 adjacent the other chip flute section 20 and a torque transmission wall 46 therebetween, which all extend from the peripheral surface 38 of the cutting head mounting portion 36 transversely inward towards cylindrical pilot portion 32. The lower base surface 42, upper base surface 44, and torque transmission wall 46 may extend either perpendicularly or at an angular orientation with axis A between peripheral surface 38 and pilot portion 32. A pair of diametrically opposed flush channels 56 extend longitudinally from upper base surface 44 toward leading end 30 of cutting head 12. The flush channels 56 enable high pressure coolant to be delivered in close proximity to the cutting surfaces to effectively remove generated chips and heat from the cutting area.

The lower base surface 42 and the upper base surface 44 of the cutting head 12 are oriented transversely to longitudinal axis A and obliquely to a radial plane through longitudinal axis A. Lower base surface 42 and upper base surface 44 are oriented obliquely inward in the radial direction and directed toward the trailing end 34 of the cutting head. Lower base surface 42 and upper base surface 44 may each be planar or formed as a curved surface, such as in a generally helical shape. Lower base surface 42 is oriented at an angle toward torque transmission wall 46 such that a first end 48 of the lower base surface 42, which mates with torque transmission wall 46, is lower with respect to leading end 30 than a second end 50 of lower base surface 42, which terminates at flute 20. Torque transmission wall 46 may be oriented at an acute angle with respect to lower base surface 42. Upper base surface 44 of the cutting head 12 may be oriented at a reverse angle from torque transmission wall 46 such that a first end 52 of the upper base surface 44 which mates with torque transmission wall 46 is lower with respect to the leading end 30 than a second end 54 of upper base surface 44. Torque transmission wall 46 may be oriented at an acute angle with respect to upper base surface 44. Upper base surface 44, torque transmission wall 46, and lower base surface 42 form a "sawtooth" engagement such that none of the base surfaces, 42, 44, are in a radial plane from longitudinal axis A and torque transmission wall 46 is oriented at an acute angle to both base surfaces 42, 44.

Figure 5:
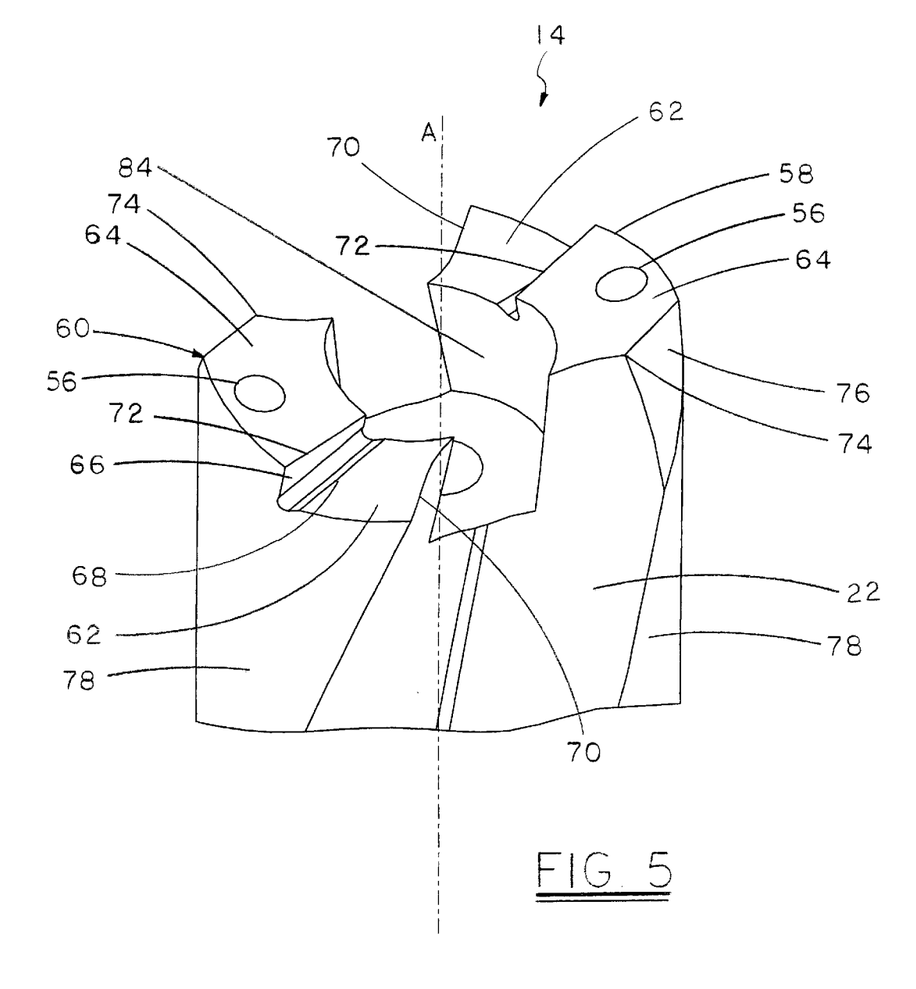
FIG. 5 is a perspective view of the leading end of the tool body which is inclined along longitudinal axis A revealing the tool body coupling portions on opposite sides of the recess in accordance with the present invention of FIG. 1.
Figure 6:
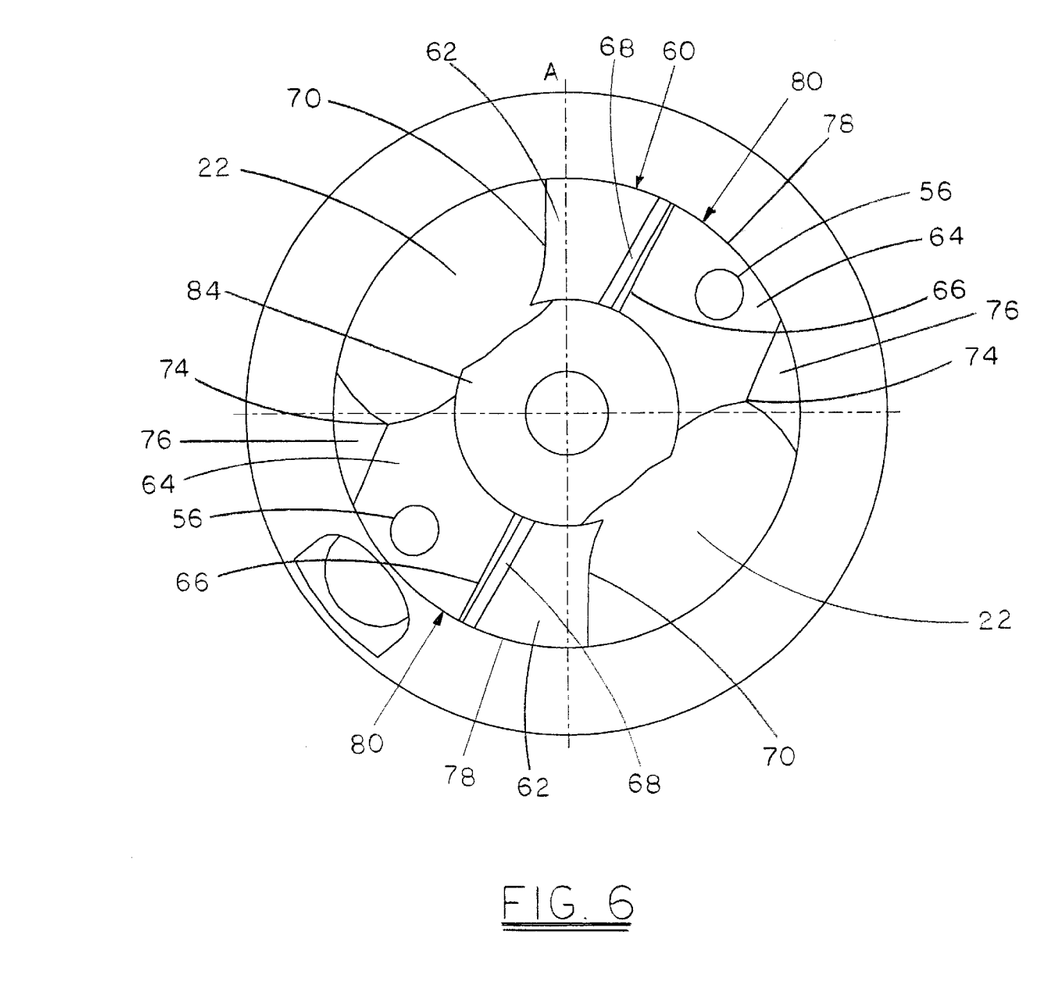
FIG. 6 is an end view of the leading end of the tool body in accordance with the present invention of FIG. 1.

Referring now to FIGS. 2, and 5–6, tool body 14 has a cutting head receiving portion 60 formed on the leading end 58 of the tool body 14. Cutting head receiving portion 60 is formed to matingly engage cutting head mounting portion 36 and cylindrical pilot portion 32 of cutting head 12. Referring again to FIG. 2, the cutting head receiving portion 60 comprises a pair of diametrically disposed tool body coupling portions 80 each radially bound by a land, or peripheral surface 78 and chip flutes 22. Each cutting head receiving portion 60 has a single-step configuration with a lower base surface 62 adjacent one chip flute section 22, an upper base surface 64 adjacent the other chip flute section 22 and a torque transmission wall 66 therebetween, which all extend from the peripheral surface 78 of the cutting head receiving portion 60, generally transversely inward towards a cylindrical recess 84 formed between coupling portions 80.

Lower support surface 62 and upper support surface 64 of the tool body 14 are both oriented transversely to longitudinal axis A and obliquely to a radial plane through longitudinal axis A. Lower support surface 62 and upper support surface 64 are oriented obliquely inward in the transverse direction and directed toward tool shank 16. Lower support surface 62 and upper support surface 64 may be planar or formed as a curved surface, such as in a generally helical shape. Lower support surface 62 is oriented at an angle toward torque transmission wall 66 such that a first end 68 of the lower support surface 62 which mates with torque transmission wall 66 is lower with respect to a second end 70 of lower support surface 62 which terminates at flute 22. Torque transmission wall 66 is oriented at an acute angle with respect to lower support surface 62. Upper support surface 64 of the tool body 14 is oriented at a reverse angle from torque transmission wall 66 such that a first end 72 of upper support surface 64 which mates with torque transmission wall 66 is lower with respect to a second end 74 of upper support surface 64 which terminates at flute 22 and surface 76 which forms a transition portion from the tool body 14 to the cutting head 12. As with the cutting head, torque transmission wall 66 is oriented at an acute angle with respect to upper support surface 64. Upper support surface 64, torque transmission wall 66, and lower support surface 62 form a "sawtooth" engagement such that none of the support surfaces, 62, 64, are in a radial plane and torque transmission wall 66 is oriented at an acute angle to both support surfaces 62, 64 of tool body 14.

Figure 7:
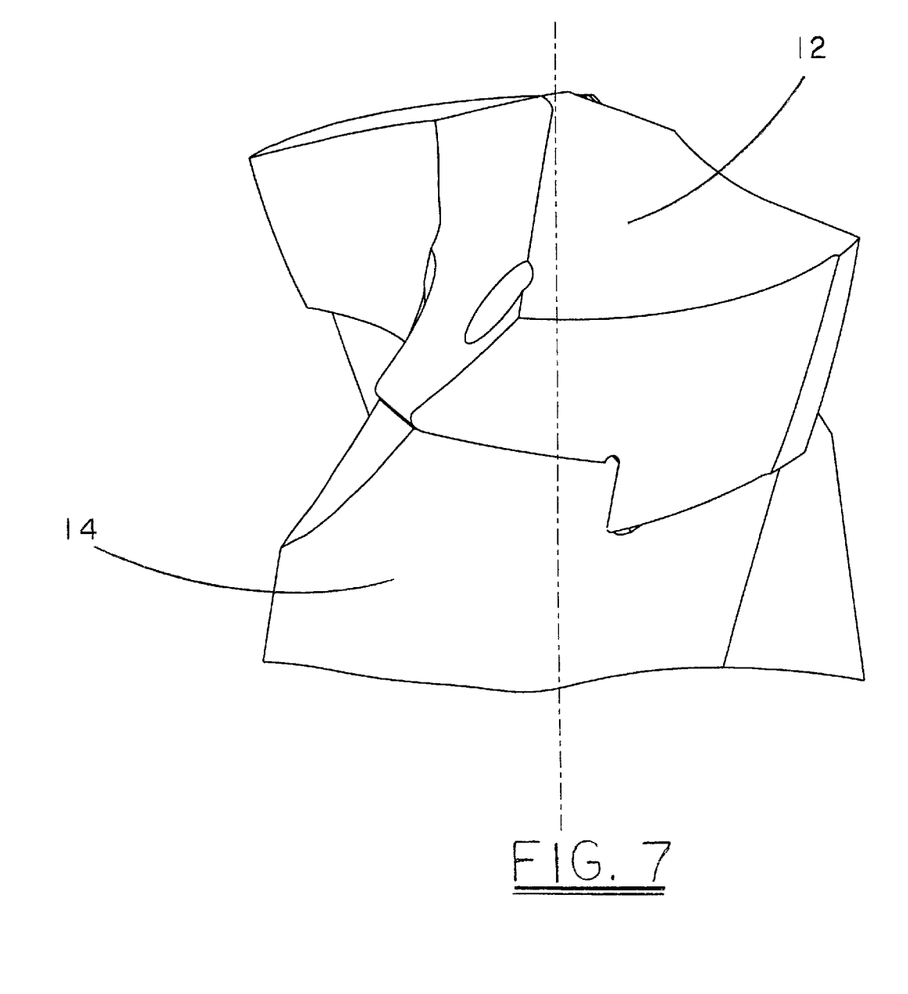
FIG. 7 is a perspective view of the cutting head mounted on the leading end of the tool body in accordance with the present invention of FIG. 1.

Cutting head 12 matingly engages tool body 14 as best shown in FIG. 7. The sawtooth engagement of the cutting head 12 on tool body 14 assists in retaining cutting head 12 on tool body 14. The angled engagement surfaces enable both torsional forces and axial forces imposed on the tool 10 in operation, to assist in securing the cutting head 12 on tool body 14. Torsional forces are transmitted directly from torque transmission wall 46 of cutting head 12 to torque transmission wall 66 of tool body 14. The opposing angled surfaces of torque transmission walls 46, 66 act to draw the cutting head 12 toward tool body 14 in operation. In a similar fashion, lower base and support surfaces 44, 64 are also angled relative to one another and the torque transmission walls 46, 66 such that a portion of axial feed forces on cutting tool assembly 10 assists in drawing torque transmission wall 46 of cutting head 12 to torque transmission wall 66 of tool body 14 resulting in the additional retention force through the sawtooth engagement. In addition, the angled surfaces of the sawtooth engagement help ensure that cutting head 12 is properly aligned on tool body 14 during assembly.

Figure 8:
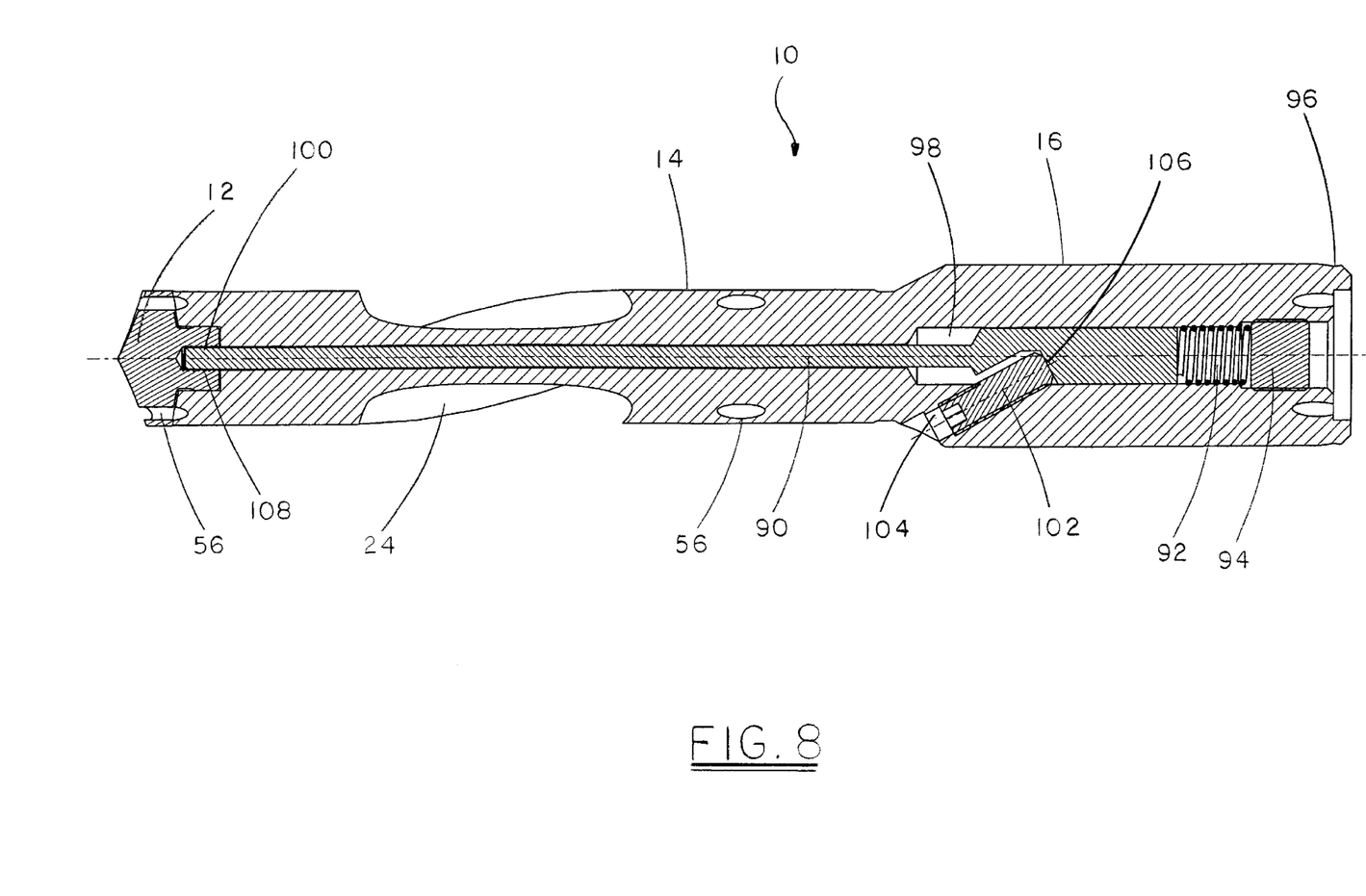
FIG. 8 is a cross-sectional view of the cutting tool assembly in an assembled state taken along longitudinal axis A.

Referring now to FIG. 8, a cross-sectional view of the assembled cutting tool assembly is shown. A fastener assembly 18 facilitates retention of the cutting head 12 on tool body 14. Fastener assembly 18 comprises a connection member 90, a spring 92, and a spring retainer plug 94. In operation, connection member 90 is inserted into a corresponding cylindrical cavity 98 along the longitudinal axis A of tool body 14. Spring 92 is then inserted into axial cavity 98 through an opening at the trailing end 96 of tool shank 16 and retained in the cavity 98 by spring retainer plug 94. Spring retainer plug 94 threadably engages the walls of cavity 98 such that spring 92 biases connection member 90 toward the leading end of the tool body 14. Connection member 90 comprises a threaded portion 108 on a leading end of the connection member 90, which matingly engages a threaded recess 100 within cylindrical pilot portion 32 of cutting head 12. The connection member 90 is drawn backwards towards a trailing end 96 of tool shank 16 by an adjusting mechanism 102. Adjusting mechanism 102 may comprise a set screw, which is adjustable in a direction transverse to longitudinal axis A within an aperture 104 in tool shank 16 which extends through from the perimeter of the tool shank 16 to cavity 98. Set screw 102 engages an angled mating surface 106 in connection member 90 thereby drawing connection member 90 towards the trailing end 96 of tool shank 16 and securing cutting head 12 thereon. Set screw 102 is adjusted to provide sufficient tension on connection member 90 to obtain a predetermined preload. In general, the preload on the connection member should be greater than the elastic deformation of the tool holder 14 and shank 16. This will help ensure that a cutting head 12 is retained on the tool body 14.

Drill assembly 10 is intended to be used such that the cutting head 12 can be replaced while the tool shank 16 remains in the tool holder (not shown). The method of replacing cutting head 12 comprises the steps of first loosening set screw 102 such that connection member 90 moves longitudinally toward the leading end of tool body 14 under the biasing force of spring 92. The cutting head 12 is either pushed away from the tool body mating surface or is rotated slightly to disengage the sawtooth engagement and allow cutting head 12 to move longitudinally under the bias force of spring 92. Once the set screw 102 has been loosened to a predetermined position, the cutting head 12 is removed from the leading end 108 of connection member 90 by rotating cutting head 12. Once cutting head 12 is sufficiently disengaged such that the cutting head mounting portion 36 of cutting head 12 and cutting head receiving portion 60 of tool body 14 do not interfere with each other, the cutting head 12 is disengaged from connection member 90. To install the replacement cutting head 12 while the tool shank 16 remains in the tool holder, the opposite procedure is used. The pilot portion 32 is axially aligned with the recess 84 in a manner that the insert 12 is axially aligned with the tool body 14. The cutting head 12 is aligned such that the threaded recess 100 in cylindrical pilot portion 32 is directly over the leading end 108 of connection member 90. The cutting head 12 is then rotated in the appropriate direction until the base and support surfaces 42, 64 of the cutting head 12 and tool body 14 approach each other. The cutting head 12 is generally aligned such that the base surfaces 42, 44 of cutting head 12 and support surfaces 62, 64 of tool body 14, respectively, are aligned, and the cutting head 12 is then rotated as the head 12 is drawn toward the support surfaces 62, 64 until matingly engaged. The cutting head 12 is then rotated slightly such that torque transfer walls 46 of cutting head 12 register against torque transfer walls 66 of tool body 14. While the cutting head is in position, set screw 102 is then rotated in an appropriate direction such that connection member 90 is moved longitudinally toward the trailing end 96 of tool shank 16 until a predetermined amount of retention force is applied on cutting head 12 against tool body 14 to provide a preload on connection member 90. As previously mentioned, the retention force is generally sufficient such that the preload on the connection member is greater than the elastic deformation of the tool holder 14 and shank 16. This will help ensure that a cutting head 12 is retained on the tool body 14.

Figure 9:
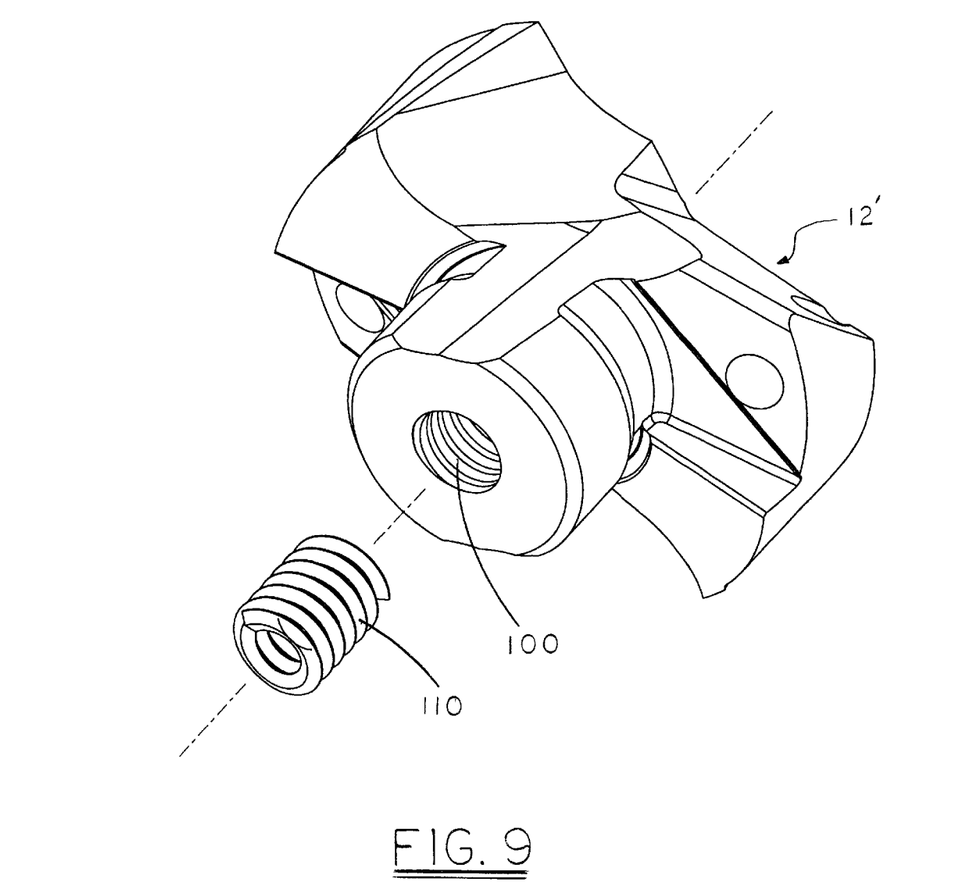
FIG. 9 is an exploded perspective view of an alternate embodiment of the present invention which includes a cutting head assembly comprising a cutting head shown inclined along longitudinal axis A and a threaded insert which is matingly attached within the threaded recess of the cylindrical pilot portion.
Figure 10:
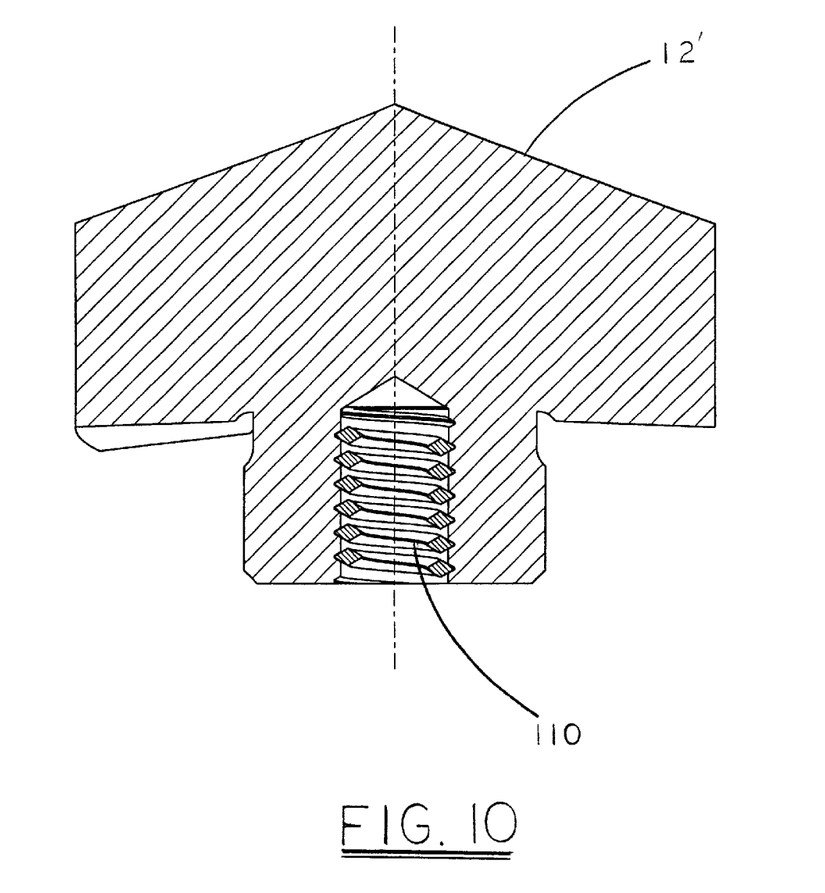
FIG. 10 is a cross-sectional view of the cutting head assembly of FIG. 9 in an assembled state showing the threaded insert matingly attached within the recess in the cylindrical pilot portion.

Turning to FIGS. 9 and 10, cutting head 12 is typically made of a hard material, such as hardened carbide, high-speed steel, ceramic material or any other suitable material. In an alternate embodiment, cutting head 12' further comprises a thread insert 110 which is inserted into threaded recess 100 on the cylindrical pilot portion 32 of cutting head 12. Thread insert 110 is used to protect the threads of connection member 90 from being worn down by the threads of tool material of the cutting head 12 while different cutting heads 12 are being repeatedly removed and replaced. The thread insert 110, being of larger diameter, will provide additional strength in the connection with cutting head 12, and will more accurately engage the retention assembly 18.

It should be recognized from the foregoing that the present invention provides distinct advantages in the use of a replaceable cutting head, while allowing operation in aggressive machining environments. The configuration of the connection between the cutting head 12 and tool body 14 provides an assembled tool which performs substantially as a unitary construction, while providing the benefits of a replaceable cutting head. In the preferred form, the base surfaces 42, 44 and support surfaces 62, 64 are configured such that the mating relationship between the surfaces is angled inwardly so feed thrust will force the insert toward the torque transmission wall to more firmly secure the cutting head 12 on the tool body 14. Further, the sawtooth connection of the preferred form provides a forward directed leading edge which creates a downward axial force vector which forces the cutting head 12 against the support surfaces 62, 64, also resulting in a more secure connection. The combination of these structures work synergistically to provide a connection which effectively removes any relative movement between the cutting head 12 and tool body 14, resulting in an assembled tool which performs in the desired manner.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A cutting tool assembly comprising:
   a replaceable cutting head and a tool body having a common longitudinal axis and mating peripheral surfaces;

said cutting head having a cutting portion forming a leading end, a pilot portion forming a trailing end, and a cutting head mounting portion adjacent said pilot of said cutting head;

said tool body having a cutting head receiving portion formed at a leading end of said tool body and a recess disposed in said leading end of said tool body to matingly receive said pilot portion of said cutting head;

said cutting head mounting portion and said cutting head receiving portion of said tool body each having at least two coupling portions, said cutting head coupling portions and said tool body coupling portions being bound by said peripheral surfaces and generally mating in shape and dimensions;

each coupling portion having a pair of surfaces, comprising an upper and a lower surface, said surfaces extending transversely to said longitudinal axis and providing support of said cutting head in said tool body, a torque transmission wall extending between said upper and lower surfaces from said pilot portion surface to said peripheral surface in a generally transverse direction relative to said longitudinal axis and oriented transversely to said surfaces, a fastener centrally disposed in said tool body along said longitudinal axis and engaging said pilot portion of said cutting head and exerting an axial force on said cutting head for pressing said cutting head mounting portion against said cutting head receiving portion of said tool body.

2. The cutting tool of claim 1 wherein at least one of said pair of surfaces is oriented obliquely in relation to a radial plane from said longitudinal axis.

3. The cutting tool of claim 1 wherein said pair of surfaces are oriented obliquely in relation to a radial plane from said longitudinal axis.

4. The cutting tool of claim 1 wherein at least one of said pair of surfaces is circumferentially oblique in relation to a radial plane from said longitudinal axis.

5. The cutting tool of claim 1 wherein said pair of surfaces is circumferentially oblique in relation to a radial plane from said longitudinal axis.

6. The cutting tool of claim 1 wherein at least one of said pair of surfaces is oriented such that a portion of a force acting longitudinally along said cutting tool is directed at least partially toward said torque transmission wall to assist in said retention of said cutting head upon said tool body.

7. The cutting tool of claim 1 wherein said fastener engages a threaded recess formed in a trailing end of said pilot portion of said cutting head.

8. The cutting tool of claim 1 wherein said fastener engages a threaded insert positioned in a recess formed in a trailing end of said pilot portion of said cutting head.

9. The cutting tool of claim 1 wherein said cutting head is made of a material selected from the group consisting of hardened carbide, high speed steel, ceramic, cemented carbide or combinations thereof.

10. The cutting tool of claim 1 wherein said cutting head is made by molding of a material into the desired final configuration.

11. The cutting tool of claim 1 wherein said fastener further comprises a connection member, a spring, a spring retainer plug and means for applying a preload on said connection member.

12. The cutting tool of claim 11, wherein said means for applying a preload on said connection member provides a preload which is greater than the elastic deformation of the tool holder during operation of the cutting tool.

13. The cutting tool of claim 11 wherein the cutting head is removable from the connection member by rotation of the cutting head to a position that it is sufficiently disengaged such that the cutting head mounting portion of the cutting head and cutting head receiving portion of the tool body do not interfere with each other, and disengaging the cutting head from the connection member.

14. The cutting tool of claim 11, wherein the cutting head is replaceable with the tool body positioned operatively in a tool holder for performing a cutting operation, wherein the pilot portion is axially aligned with the tool body such that the pilot portion is directly over a leading end of the connection member, and wherein the cutting head is rotatable into engagement with the connection member until the mounting portion of the cutting head and cutting head receiving portion of the tool body approach each other and such that the mounting portion of the cutting head and cutting head receiving portion of the tool body are generally aligned, wherein the cutting head is then rotatable such that said torque transmission walls of the at least two coupling portions register against one another.

15. The cutting tool of claim 14, wherein the means for applying a preload on said connection member is operated once the torque transmission walls of the at least two coupling portions register against one another.

16. A method of mounting and replacing a replaceable cutting head of a cutting tool assembly comprising the steps of:

1) providing a cutting tool having a replaceable cutting head and a tool body having a common longitudinal axis and mating peripheral surfaces, said cutting head having a cutting portion forming a leading end, a pilot portion forming a trailing end, and a cutting head mounting portion, and said tool body having a cutting head receiving portion formed at a leading end of said tool body and a recess disposed in said leading end of said tool body to matingly receive said pilot portion of said cutting head, wherein said cutting head mounting portion and said cutting head receiving portion of said tool body each having at least two coupling portions, each coupling portion having a pair of surfaces extending transversely to the longitudinal axis of the cutting tool and providing support of said cutting head with said tool body and having a torque transmission wall extending between said pair of surfaces in a generally transverse direction relative to said longitudinal axis and oriented transversely to said surfaces, and a fastener centrally disposed in said tool body along said longitudinal axis, 2) axially aligning the pilot portion with the tool body such that the pilot portion is directly over a leading end of the fastener, 3) engaging said pilot portion of said cutting head with said fastener, 4) rotating the cutting head into engagement with the fastener until the mounting portion of the cutting head and cutting head receiving portion of the tool body approach each other and such that the mounting portion of the cutting head and cutting head receiving portion of the tool body are generally aligned, 5) rotating the cutting head further such that said torque transmission walls of the at least two coupling portions register against one another, and 6) using the fastener to exert an axial force on said cutting head for pressing said cutting head mounting portion against said cutting head receiving portion of said tool body, whereby the cutting head is replaceable by providing a replacement cutting head and repeating steps 2 through 6 while the tool body is positioned in a tool holder associated with a cutting operation.

* * * * *